United States Patent
Zhu

(10) Patent No.: US 7,769,394 B1
(45) Date of Patent: Aug. 3, 2010

(54) SYSTEM AND METHOD FOR LOCATION-BASED DEVICE CONTROL

(75) Inventor: Kevin K. Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 477 days.

(21) Appl. No.: 11/539,546

(22) Filed: Oct. 6, 2006

(51) Int. Cl.
*G06F 15/16* (2006.01)

(52) U.S. Cl. .................. 455/456.1; 455/456.6

(58) Field of Classification Search ............ 455/456.1, 455/422, 403, 404.1, 405, 406, 414.1, 432.1, 455/456.3, 456.6
See application file for complete search history.

(56) References Cited

U.S. PATENT DOCUMENTS

| | | | |
|---|---|---|---|
| 6,950,662 B2 * | 9/2005 | Kumar | ............ 455/456.3 |
| 7,194,278 B1 | 3/2007 | Cook | |
| 2004/0102197 A1 * | 5/2004 | Dietz | ............ 455/456.1 |
| 2004/0131014 A1 * | 7/2004 | Thompson et al. | ........ 370/230 |
| 2005/0192029 A1 * | 9/2005 | Aigner et al. | ............ 455/456.5 |
| 2005/0202832 A1 * | 9/2005 | Sudit | ............ 455/456.1 |
| 2008/0043689 A1 * | 2/2008 | Walter | ............ 370/338 |

\* cited by examiner

*Primary Examiner*—Sam Bhattacharya

(57) ABSTRACT

A system and method for location-based device control is provided. At least some of the illustrative embodiments are systems comprising a locating subsystem, a server, and a mobile device comprising a component manager. The component manager allows modifications to the operation of components of the mobile device based on a location provided by the locating subsystem. The component manager also provides confirmation of the modified operation of the components of the mobile device to the server.

20 Claims, 4 Drawing Sheets

SYSTEM AND METHOD FOR LOCATION-BASED DEVICE CONTROL

BACKGROUND

It is now commonplace for an individual to carry one, if not several, mobile electronic devices such as a cellular telephone, a personal digital assistant (PDA), a pager, a mobile computer, a digital camera, a digital music player, a digital calculator, an electronic key fob, or a mobile device comprising some combination of these devices. Such devices are often capable of a multitude of functions some of which comprise recording audio, video, or taking still images, as well as providing an alert by way of a vibrator or speaker, or wireless communicating with other devices or networks, among others. At times, such advanced capabilities may be undesirable in situations where privacy is expected (e.g., a locker room of an athletic club), proprietary or sensitive information is available (e.g., research installations for a company generating intellectual property or a government agency dealing with sensitive matters), or silence is appreciated (e.g., a movie theater, a place of worship, or others).

SUMMARY

Accordingly, disclosed herein are systems and methods for location-based device control. In some embodiments, systems comprise a locating subsystem, a server, and a mobile device comprising a component manager. The component manager allows modifications to the operation of components of the mobile device based on a location provided by the locating subsystem. The component manager also provides confirmation of the modified operation of the components of the mobile device to the server.

Other embodiments are computer-readable media storing a component manager software program that, when executed by the processor of a mobile device, causes the processor to receive requests to modify operation of components of the mobile device from a requestor, modify the operation of the components of the mobile device based on the requests by way of operating system drivers, and provide confirmation of the modified operation of the components of the mobile device to the requestor.

Yet other embodiments are methods comprising defining a restricted geographic region and a rule set corresponding to the restricted geographic region defining mobile device components that may or may not be enabled within the restricted geographic region, transmitting requests to modify operation of the components of a mobile device in the restricted geographic region, and receiving confirmation of the modified operation of the components of the mobile device.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Typical embodiments of the disclosed systems and methods relate to verifying a mobile device's compliance with a location-based device control strategy. For example, a mobile device (e.g., a cellular phone with an integrated video camera) within or near a restricted geographic region, such as the locker room of an athletic club, receives requests transmitted by a location-based device control system. The requests may comprise requests to disable certain hardware components of the mobile device (e.g., the video camera component) while the device is in or near the restricted geographic region. The mobile device, in turn, is configured to provide confirmation of completion of the requests. The confirmation may be provided via the mobile device itself, via a server, via an audible tone or indication, or by some alternative means, and the confirmation may be further verified by an individual enforcing device compliance. In situations wherein confirmation is not provided, the mobile device may be confiscated by the individual providing enforcement, or the mobile device may be completely locked while the device is within or near the restricted region.

Figure 1:
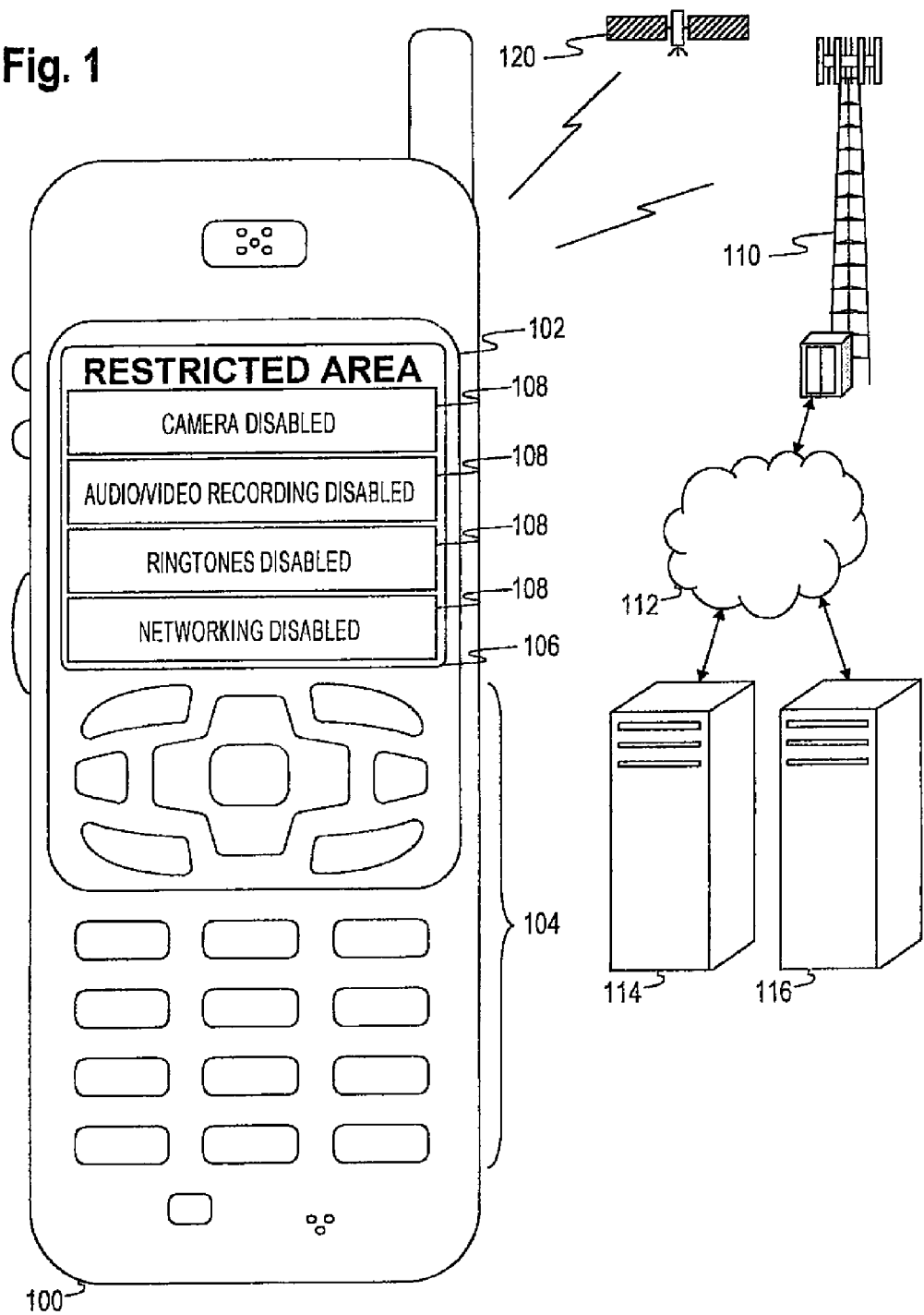
FIG. 1 is a wireless communications system in accordance with embodiments of the invention.

FIG. 1 shows a wireless communications system comprising an illustrative mobile device 100. Though illustrated as a mobile phone, device 100 may take various forms such as a personal digital assistant (PDA), a mobile computer, a digital camera, a digital music player, a digital calculator, or an electronic key fob for keyless entry. Many suitable mobile devices combine some or all of these functions. In some illustrative implementations, the mobile device is not a general purpose computing device like a notebook or tablet computer, but rather is a special-purpose communications device such as a mobile phone, pager, or PDA.

Mobile device 100 comprises a display 102 and a touch-sensitive surface or keys 104 with which to interact with a user. The mobile device 100 may present options for the user to select, controls for the user to actuate, and/or cursors or other indicators for the user to direct. The mobile device 100 may further accept data entry from the user, comprising numbers to dial or various other values for configuring the operation of the mobile device 100. Mobile device 100 may further execute one or more software or firmware applications in response to user commands or in response to external commands, requests, or other stimuli. These applications may configure the mobile device 100 to perform various customized functions.

Among the various applications executable by the illustrative mobile device 100 is a component manager software application configured to control specific components of the mobile device 100 based on a rule set defining whether components of the mobile device may be enabled within a restricted geographic region. The components comprise one or more selected from the group: a camera component; an audio recording component; a video recording component; a networking component; an audible or inaudible output component such as a speaker or a vibrator; a graphical user interface; an input component such as a keypad or a microphone; or a port such as an infrared (IR) or universal serial bus (USB) port, among others. The restricted geographic region may comprise a business location comprising a retail or wholesale store, an athletic club, a non-profit operation, a government entity or alternative place of business or a portion of the business location such as a locker room of the athletic club. Shown on the display 102 is an illustrative screen 106 indicating that the mobile device 100 is within the restricted geographic region that defines a restricted area of operation and showing indicators 108 to confirm to the user that specific components of the mobile device 100 have been disabled. In alternative embodiments, the indicators 108 may confirm that specific components have been enabled, suspended, or had their operation otherwise modified.

The location of the mobile device 100 may be determined by any one or more of a number of available position determination methods, such as by a global positioning system (GPS) comprising a GPS satellite 120 and/or triangulation from multiple base stations or cell towers via wireless communications between the mobile device 100 and a cell tower 110 or a wireless network access node. The cell tower 110 (or wireless network access node) is coupled to a wired network 112 such as a telephone network, the Internet, or other high-speed network via a mobile switching center and/or an Ethernet connection. Via the wireless link and the wired network, the mobile device 100 may be in communication with various servers such as a local server 114 or a backend server 116. The servers may provide such information as parameters (e.g., coordinate values) that define the restricted geographic region. In alternative embodiments, the restricted geographic region may be defined by local antennas (e.g., circumscribing the restricted geographic region), or by other available means.

The backend server 116 may be a wireless carrier server and may store the rule set that defines which components of the mobile device 100 may or may not be enabled within the restricted geographic region. The local server 114 may be within or near to the restricted geographic region that defines the restricted area of operation, and the local server 114 may communicate with the backend server 116 through the wired network 112 to retrieve the rule set. In some embodiments, the rule set may be stored on the local server 114. In some embodiments, the local server 114 may provide local control of a location-based device control system deployed at a certain geographic location. In other embodiments, the local server 114 may provide local confirmation of modified operation of a component of the mobile device 100. In some exemplary embodiments, functions performed by the backend server 116 may be performed by the local server 114 for example, to reduce system latency. In other exemplary embodiments, functions performed by the local server 114 may be performed by the backend server 116 for example, to reduce system costs associated with implementing a local server 114. In yet other embodiments, certain functions may be spread between the local server 114 and the backend server 116.

While within the defined restricted geographic region, the component manager software application may receive requests transmitted (or broadcast) by the local server 114 or the backend server 116 to disable components of the mobile device 100 as prescribed by the rule set. In some illustrative embodiments, mobile devices 100 that are non-compatible with a location-based device control system are not able to comply with the requests. In other illustrative embodiments comprising compatible mobile devices, users may manually deny requests to disable. Whether due to non-compatible mobile devices 100 or users who manually deny requests to disable, devices that do not comply with the requests may be confiscated while the user is within the restricted geographic region. In alternative embodiments wherein devices do not comply with the requests to disable, some contemplated location-based device control systems may completely lock a mobile device 100 while the device is within or near the restricted geographic region without regard to specific device location or specific hardware components. In this case the mobile device will be unlocked only upon leaving the restricted geographic region.

For those mobile devices that are compatible and comply with the requests to disable, the component manager software application is what is utilized to disable the appropriate components of the mobile device 100 via operating system drivers within a digital signal processor (as described below). In alternative embodiments, the user of the mobile device 100 may manually disable the components via the keys 104 in response to the requests. In some embodiments, the restricted geographic region may be circumscribed by a periphery region wherein the mobile device 100 may receive requests transmitted by the local server 114 or the backend server 116 to enable components that were previously disabled while within the restricted geographic region, such as when a user is leaving the restricted geographic region by way of the periphery region carrying a mobile device with a disabled component.

Considering the example of an athletic club, the restricted geographic region may be defined to be the locker rooms of the club, while the periphery region may be the rest of the athletic club excluding the locker rooms. In an alternative embodiment, the restricted geographic region may be the entire athletic club, while the periphery region may comprise a parking lot of the club. Requests to enable components may be manually fulfilled by the user or may be fulfilled by the component manager software application via the operating system drivers. In some exemplary embodiments, the user may manually request the enabling of components of the mobile device 100 upon leaving a restricted geographic region. In such a case, before enabling the components via the operating system drivers, the component manager software application is configured to validate that the mobile device 100 is not within a restricted geographic region whose rule set prohibits the enabling of the components that the user is requesting to enable.

In any case, the component manager software application is also configured to provide confirmation in response to requests to enable components of the mobile device 100. In some embodiments, wherein the requestor is the user of the mobile device (e.g., wherein the user manually selects components to be disabled or enabled by way of the keys 104) the component manager software application may provide confirmation by way of the indicators 108 (FIG. 1). In alternative embodiments, wherein the requestor is the local server 114 or the backend server 116, the component manager software application may provide confirmation by way of a database entry within one or both of the local server 114 or the backend server 116; an audible tone, audible message, or other audible indication generated by the mobile device 100, the local server 114, or the backend server 116; a visual indication via a graphical user interface electrically coupled to the local server 114 or the backend server 116; or other alternative means. In embodiments wherein the requestor is the local server 114 or the backend server 116, confirmation may still be provided by way of the indicators 108 (FIG. 1). For embodiments comprising non-compatible devices, it may not be possible to provide confirmation as described herein, thus appropriate actions should be taken such as confiscating or completely locking the mobile device (as discussed above).

In some illustrative embodiments, confirmation of device compliance may be enforced by a security guard (or other individual) stationed at an entrance to a restricted geographic region. Consider for example the case of a high-tech research installation for a company that generates intellectual property and which employs a location-based device control system. The intellectual property may comprise technical publications, information contained in laboratory notebooks, files and/or data contained within company computer networks, confidential information presented in meetings, or other sensitive information. Attempts to compromise the privacy of such information may comprise any of several unauthorized activities (using an enabled mobile device) such as audio recordings of meetings via the audio recording component of the mobile device, photographic or video recordings of documents such as laboratory notebooks or unpublished publications via the camera or video recording components, downloading of files/data from a computer or from a computer network via an input/output (I/O) interface such as the IR or USB ports, or other unauthorized activities utilizing the mobile device.

A security guard may be stationed at the entrance to such a high-tech research installation in order to check identification badges, for example, to protect against unauthorized entry into the facility. In addition to checking badges, the security guard may enforce compliance of mobile devices entering the facility. In some embodiments, the user of a mobile device may show the device to the security guard so that the security guard may visually confirm device compliance. In other embodiments, the security guard may interface with a graphical user interface (e.g., a computer monitor) electrically coupled to the local server 114, wherein the graphical user interface provides a visual indication as to compliance of the mobile device. In yet other embodiments, a mobile device may download a specific "ringer of the day" or other ringtone from the local server 114 or the backend server 116 that will be played by those devices that are in compliance. Thus, the security guard may take appropriate action (e.g., confiscate or completely lock the mobile device) if a ringtone is not heard or if an incorrect ringtone (for a given day) is heard. In some illustrative embodiments, the security guard may request a user's cellular telephone number (or other mobile device identification such as a serial number, for example) which may then be entered into the local server 114 by the security guard. The local server 114 may then cross-reference the telephone number to a database (or other record) comprising a listing of devices that have been successfully disabled, and if there is a match, the device is thus found to be in compliance and the user may proceed to enter the facility. In some embodiments, the database comprising the listing of successfully disabled devices may be stored within the local server 114 or the backend server 116. There may be some embodiments in which the total number of individuals entering or leaving a facility make enforcement of device compliance a difficult task, or there may be situations where certain unscrupulous individuals attempt to circumvent detection by the security guard or other controls that are in place. In some situations, companies (or other users of a location-based device control system) may be willing to accept the risk of a certain number of non-compliant devices entering their facility. However, in situations where such risk is not an option, a secure facility may be forced to hire additional security, confiscate all electronic devices, or completely lock or disable all devices within or near the restricted region without regard to specific device location or specific hardware components. In this case the mobile device will be unlocked only upon leaving the restricted region.

Figure 2:
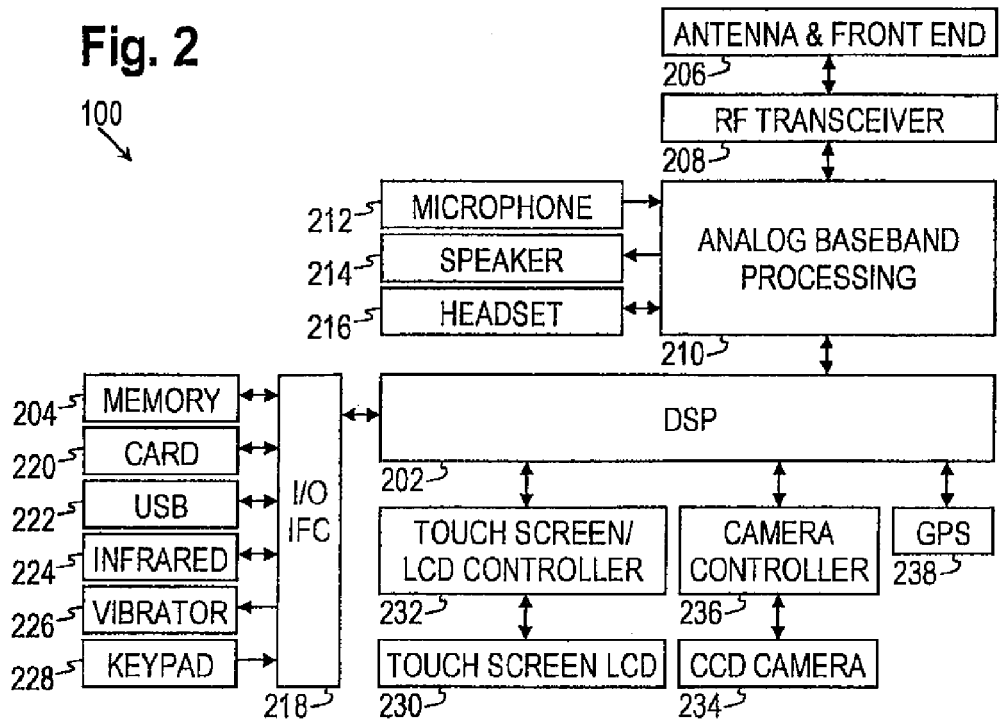
FIG. 2 is a block diagram of an illustrative mobile device.

FIG. 2 shows a block diagram of the illustrative mobile device 100. Mobile device 100 comprises a digital signal processor (DSP) 202 and a memory 204. As shown, illustrative mobile device 100 may further comprise an antenna and front end unit 206, a radio frequency (RF) transceiver 208, an analog baseband processing unit 210, a microphone 212, an earpiece speaker 214, a headset port 216, an input/output interface 218, a memory card 220, a universal serial bus (USB) port 222, an infrared (IR) port 224, a vibrator 226, a keypad 228, a liquid crystal display (LCD) with a touch sensitive surface 230, a touch screen/LCD controller 232, a charge-coupled device (CCD) camera 234, a camera controller 236, and a GPS sensor 238.

The DSP 202 or some other form of controller or central processing unit operates to control the various components of the mobile device in accordance with embedded software or firmware stored in memory 204. Moreover, the component manager software operates cooperatively with operating system drivers within the DSP 202 (as described below) to enable or disable components of the mobile device 100 based on the location of the mobile device and on the rule set governing that location. In some exemplary embodiments, the functionality of the component manager software may be implemented as a separate hardware component integrated into the mobile device 100 that electrically couples to the DSP 202 to ensure compliance with a location-based control system. The DSP 202 may also execute other applications stored in memory 204 or made available via information carrier media such as portable data storage media like memory card 220 or via wired or wireless network communications. The application software may comprise a compiled set of machine-readable instructions that configure the DSP to provide the desired functionality, or the application software may be high-level software instructions to be processed by an interpreter or compiler to indirectly configure the DSP.

An antenna and front end unit 206 may be provided to convert between wireless signals and electrical signals, enabling mobile device 100 to send and receive information from a cellular network or some other available wireless communications network. Communications between the mobile device 100 via the front end unit 206 and multiple cell towers with directional detection and/or relative strength sensing may be used to triangulate the position of the mobile device 100 for use by the component manager software. The RF transceiver 208 provides frequency shifting, converting received RF signals to baseband and converting baseband transmit signals to RF. Analog baseband processing unit 210 may provide channel equalization and signal demodulation to extract information from received signals, may modulate information to create transmit signals, and may provide analog filtering for audio signals. To that end, the analog baseband processing unit 210 may have ports for connecting to a built-in microphone 212 and earpiece speaker 214 that enable the mobile device 100 to be used as a mobile phone. The analog baseband processing unit 210 may further include a port for connecting to a headset or other hands-free microphone and speaker configuration.

DSP 202 may send and receive digital communications with a wireless network via analog baseband processing unit 210. In some embodiments, these digital communications may provide Internet connectivity, enabling a user to gain access to content on the Internet and to send and receive email or text messages. An input/output interface 218 interconnects the DSP 202 and various memories and interfaces. Memory 204 and removable memory card 220 may provide software and data to configure the operation of DSP 202. Among the interfaces may be a USB interface 222 and an infrared (IR) port 224. The USB interface may enable the mobile device 100 to function as a peripheral device to exchange information with a personal computer or other computer system. The IR port 224 and other optional ports such as a Bluetooth interface or an IEEE 802.11 compliant wireless interface may enable the mobile device 100 to communicate wirelessly with other nearby mobile devices and/or wireless base stations. In particular, the mobile device 100 may communicate with multiple local wireless base stations having antennas with directional detection and/or relative strength sensing to triangulate the position of the mobile device 100 for use by the component manager software. In other exemplary embodiments, the component manager software may be provided with the position of the mobile device 100 as determined by GPS sensor 238, which is coupled to DSP 202 to decode global positioning system signals.

Input/output interface 218 may further connect the DSP 202 to a vibrator 226 that, when triggered, causes the mobile device 100 to vibrate. The vibrator 226 may serve as a mechanism for silently alerting the user to any of various events such as an incoming call, a new text message, an appointment reminder, or a component that has had its operation modified.

A keypad 228 couples to the DSP 202 via interface 218 to provide one mechanism for the user to make selections, enter information, and otherwise provide input to the mobile device 100. Another input mechanism may be a touch screen display 230, which may also display text and/or graphics to the user. A display controller 232 couples the DSP 202 to the touch screen display 230.

CCD camera 234 enables the mobile device 100 to take digital pictures. The DSP 202 communicates with the camera 234 via a camera controller 236. The mobile device may also be able to capture video clips through the CCD camera 234 by employing a video application specific integrated circuit (ASIC). Various other peripherals may also be included to provide additional functions, e.g., radio and television reception.

Figure 3:
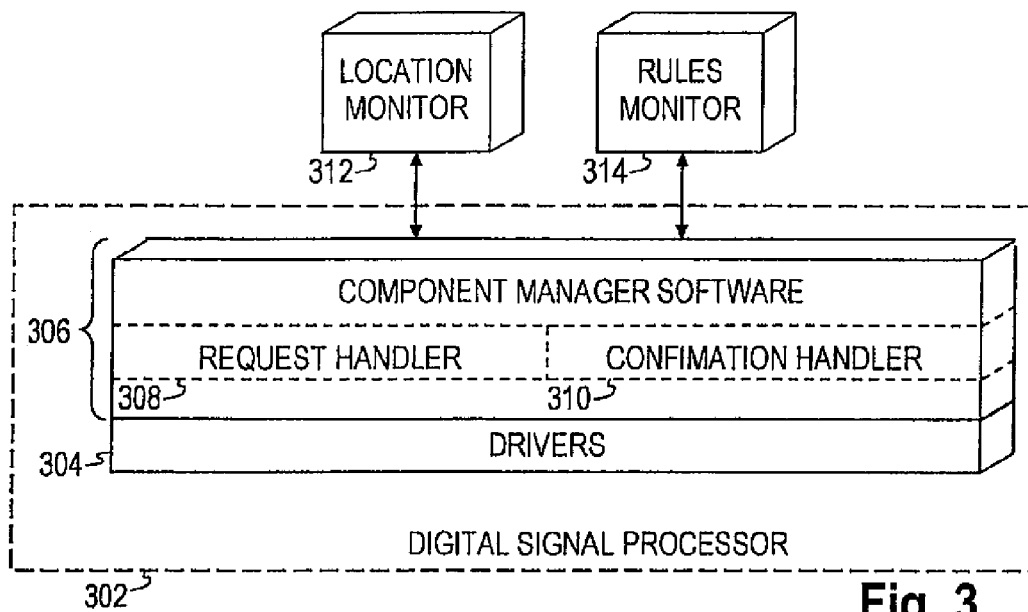
FIG. 3 is a block diagram of an illustrative software environment comprising component manager software.

FIG. 3 illustrates a software environment 302 that may be implemented by the DSP 202. The DSP 202 executes operating system software that provides a platform from which the rest of the software operates. Moreover, the operating system software provides drivers 304 for the mobile device hardware that may be used to enable or disable individual hardware components (the components as shown in FIG. 2, among others). Also, the drivers 304 are provided with standardized interfaces that are accessible to application software and other software of the operating system. In particular, the drivers 304 may interface with component manager software 306, wherein the component manager software 306 may have overriding control (over other application software or other software of the operating system) of the hardware components of the mobile device 100 (based on the location of the mobile device and on rule set governing that location). The component manager software 306 may operate as part of the operating system or as separate software operating within the DSP 202.

The actual enabling or disabling of the hardware components of the mobile device 100 may be accomplished a number of ways. In some exemplary embodiments, each hardware component of the mobile device 100 has an associated register that controls its operation, wherein the register comprises a bit for enabling or disabling the hardware component, and wherein the DSP 202 sets or resets the enabling/disabling bit accordingly. In another embodiment, the DSP 202 may access (via the input/output interface 218) a hardware control unit that distributes a clock signal to each hardware component, and the DSP 202 may direct the hardware control unit to start or stop the clock signal to a particular component, thus enabling or disabling a particular hardware component. In yet other embodiments, the DSP 202 may set a status word in memory 204 (or other memory) that indicates that a particular hardware component is enabled or disabled. In such an embodiment, the DSP 202 may check the status word in memory 204 whenever access requests are made to particular hardware components by application programs, and the DSP 202 can disregard any access requests made to hardware components that have been indicated as being disabled by the status word and return an error message to the application programs requesting access to that particular hardware component. Other methods of enabling or disabling the hardware components as known in the art may also be used.

Returning to FIG. 3, the component manager software 306 may interface with other software on the mobile device 100 such as location monitor software 312 and rules monitor software 314 to determine the location of the mobile device 100 and the particular rule set that applies to a given restricted geographic region, respectively. The location monitor software 312 may periodically update the location of the mobile device 100 and provide such information to the component manager software 306 based on a determination of location as made by the GPS sensor 238, by triangulation, or otherwise (as described above). The rules monitor software 314 may periodically update the rule set via wireless communication with the local server 114 or the backend server 116 and provide such information to the component manager software 306. The updating of the rule set may be synchronous (or nearly synchronous) with the updating of the location of the mobile device 100 so that the rule set remains applicable to the current location of the mobile device 100. Based on the location and the rule set (as defined for a particular restricted geographic region), the component manager software 306 takes appropriate actions such as enabling or disabling particular hardware components via commands to the drivers 304 that directly control the mobile device hardware.

The component manager software 306 further comprises a request handler 308 and a confirmation handler 310. The request handler 308 processes requests to disable or enable a particular device component, wherein the request may be transmitted (or broadcast) by the local server 114 or the backend server 116, or may be manually entered by the user of the mobile device 100. In the case of multiple or simultaneous requests, the request handler 308 may queue the requests and process them in the order received. In alternative embodiments, the requests may each have an assigned priority, and the requests may thus be processed according to their priority. The confirmation handler 310 provides confirmation in response to a request (as described above with respect to the component manager software application). In some embodiments, the confirmation handler 310 may provide notification of a denied request such as when the user of the mobile device 100 requests to enable a hardware component that is not allowed by the rule set corresponding to the current location of the mobile device 100.

In some contemplated systems, the location-based control of mobile devices may be a service offered to customers (e.g., businesses comprising a particular restricted geographic region in which they would like to restrict the use of certain components of mobile devices) by wireless carriers, and the confirmation handler 310 would serve to provide paying customers with confirmation that their location-based device control system is properly disabling or enabling specified components of mobile devices within the defined restricted geographic region of their business. Moreover, mobile devices may be configured to only recognize requests from specific "trusted" sources, such as a specific paying customer (e.g., an athletic club) or a specific wireless carrier. As such, requests to disable or enable components of mobile devices from unrecognized third parties (e.g., non-paying customers, other wireless carriers, or others) will be disregarded. In other exemplary systems, some mobile devices may not be compatible with a system implementing location-based control of mobile devices. Such non-compatible devices would not return the expected confirmation and in some embodiments may instead result in an error message being returned to the requestor, thus allowing businesses to take appropriate action such as confiscating the non-compatible mobile devices while the user is within the restricted geographic region. In alternative embodiments comprising compatible or non-compatible devices, some contemplated systems may completely lock a mobile device while the device is within or near the restricted geographic region without regard to specific device location or specific hardware components. In this case the mobile device will be unlocked only upon leaving the restricted geographic region.

Figure 4:
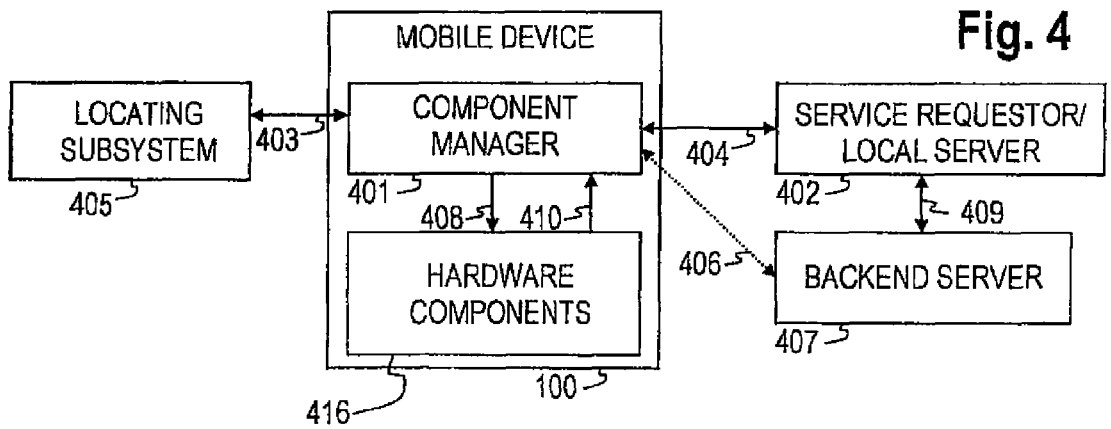
FIG. 4 is a first system in accordance with embodiments of the invention configured for location-based device control.

FIG. 4 shows a first system embodiment for location-based device control of components of a mobile device 100. In particular, FIG. 4 shows embodiments wherein the mobile device 100 is entering a restricted geographic region. A service requestor 402 (e.g., a business location such as an athletic club) comprises a local server that defines the restricted geographic region via the parameters (as described above) as well as the rule set governing that region.

A component manager 401 on the mobile device 100 retrieves a signal from a locating subsystem 405 (that indicates the location of the mobile device 100) as shown by arrow 403, wherein the locating subsystem may comprise the GPS satellite 120 (FIG. 1), the cell tower 110 (FIG. 1) or base stations, or local antennas, among others. In some exemplary embodiments, the component manager 401 may provide the location of the mobile device 100 to the service requestor 402 as shown by arrow 404, and if the mobile device 100 is within the restricted geographic region as defined by the parameters, the service requestor 402 may request that certain components of the mobile device 100 be disabled as defined by the rule set stored on the local server of the service requestor 402. The rule set may have been previously retrieved from the backend server 407 as shown by arrow 409. In some exemplary embodiments, the service requestor 402 may send a message to the backend server 407 asking the backend server 407 to directly make the request to disable components of the mobile device 100 as shown by dashed arrow 406. In other embodiments, the component manager 401 may provide the location of the mobile device 100 directly to the backend server 407 as shown by dashed arrow 406. Again, if the mobile device is within the region as defined by the parameters, the backend server 407 may request that certain components of the mobile device 100 be disabled based upon the rule set stored on the backend server 407. In some embodiments, the backend server 407 may have previously retrieved the rule set from the local server of the service requestor 402 as shown by arrow 409, for example, in embodiments where rules have been entered locally by an individual interfacing with the local server of the service requestor 402 and wherein those rules have been subsequently transferred to the backend server 407. In yet other embodiments, the service requestor 402 or the backend server 407 may request the disabling of the components of the mobile device 100 based on the rule set without knowing the location of the mobile device 100. Upon receiving such a request, the component manager 401 may subsequently determine the location of the mobile device 100 (as described above) and process the request if the mobile device 100 is within the restricted geographic region as defined by the parameters (i.e., the request is valid). Otherwise, the request is invalid and is disregarded.

The requests are processed by the component manager 401. In particular, the component manager 401, by way of the drivers 304 (FIG. 3) provided by the operating system running on the DSP 202 (FIG. 2), proceeds to disable hardware components 416 of the mobile device 100 as shown by arrow 408. After disabling the hardware components 416, the component manager 401 provides confirmation to the service requestor 402 (as shown by arrow 404), to the backend server 407 (as shown by dashed arrow 406), or to the mobile device itself via the display 102 (FIG. 1) by way of the indicators 108 (FIG. 1). In alternative embodiments, confirmation may be provided via other hardware components of the mobile device such as the vibrator 226 (FIG. 2), the speaker 214 (FIG. 2), or others. The local server of the service requestor 402 or the backend server 407 may store information regarding which components of which mobile devices within the restricted geographic region have been confirmedly disabled so that superfluous requests are not made. In some embodiments, information may be stored within the memory of the mobile device 100 regarding disabled components of the device so that superfluous requests are not processed.

Figure 5:
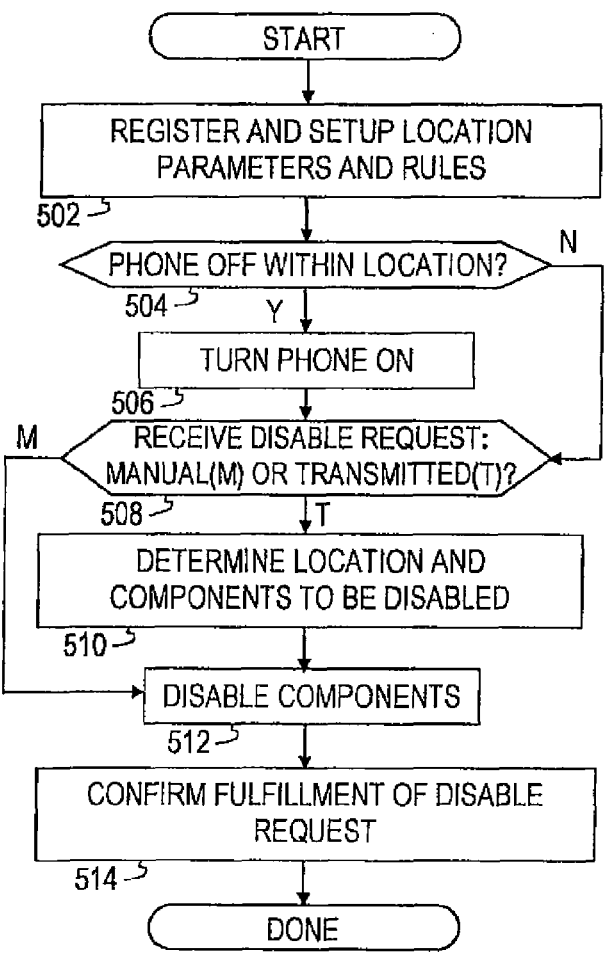
FIG. 5 is a first method in accordance with embodiments of the invention configured for location-based device control.

The foregoing process is shown as a flow diagram in FIG. 5. In block 502, the service requestor may register with a wireless carrier providing the system for location-based device control of components of a mobile device. Also in block 502, the service requestor sets up parameters that define the restricted geographic region that is to be monitored by the location-based device control system, and the service requestor defines the rule set that prescribes which components of the mobile device 100 may or may not be enabled within the restricted geographic region defined by the parameters. In block 504, a mobile device 100 enters the restricted geographic region, wherein the mobile device may be powered on or powered off. If the mobile device is powered off, the service requestor may request the user of the mobile device 100 to power on the mobile device 100 in block 506. Such a request may come from an individual, a posted sign, an electronic display, an audible recording, or other available method. Once the mobile device 100 has been powered on, the mobile device 100 may receive requests in block 508 to disable particular hardware components. If the mobile device 100 was powered on upon entering the restricted geographic region, the process proceeds directly from block 504 to receiving requests to disable components in block 508. The requests to disable in block 508 may be manual requests made by the user of the mobile device 100 or they may be requests transmitted by the location-based device control system (e.g., by the service requestor/local server or by the backend server). For the case of requests transmitted by the location-based device control system, the component manager in block 510, by way of the location monitor and the rules monitor, will retrieve the location of the mobile device 100 and determine which components should be disabled as prescribed by the rule set. If the mobile device 100 determines that it is not within the restricted geographic region, then the request will be disregarded. In some exemplary embodiments, the component manager may receive the request to disable after it has provided the service requestor or the backend server with the location of the mobile device 100 and it has been determined that the mobile device 100 is within the restricted geographic region. In block 512, the component manager, by way of the drivers 304 provided by the operating system running on the DSP 202, disables the components of the mobile device 100 as prescribed by the rule set. For the case of manual requests to disable, the user of the mobile device 100 may manually request the disabling of components of the mobile device 100 in block 508. In such embodiments comprising a manual request to disable, determination of the location of the mobile device 100 (block 510) may be skipped and the components may be directly disabled by the component manager in block 512 as indicated in FIG. 5. After disabling of the components is complete, in block 514 the component manager confirms fulfillment of the request to disable to the user of the mobile device, to the service requestor, or to the backend server.

Returning to FIG. 4, consider the case when mobile device 100 is leaving a restricted geographic region and is within the periphery region. While in the periphery region, the mobile device 100 may receive transmitted (or broadcast) requests to enable components that were previously disabled while within the restricted geographic region. Requests to enable components may be manually fulfilled by the user or may be fulfilled by the component manager via the operating system drivers.

The component manager 401 on the mobile device 100 retrieves a signal from the locating subsystem 405 (that indicates the location of the mobile device 100) as shown by arrow 403. In some embodiments, the component manager 401 may provide the location of the mobile device 100 to the service requestor 402 as shown by arrow 404, and if the mobile device 100 is within the periphery region, the service requestor 402 may request that previously disabled components of the mobile device 100 be enabled. In some embodiments, the service requestor 402 may send a message to the backend server 407 asking the backend server 407 to directly make the request to enable components of the mobile device 100 as shown by dashed arrow 406. In other embodiments, the component manager 401 may provide the location of the mobile device 100 directly to the backend server 407 as shown by dashed arrow 406. Again, if the mobile device is within the periphery region, the backend server 407 may request that previously disabled components of the mobile device 100 be enabled. In yet other embodiments, the service requestor 402 or the backend server 407 may request the enabling of the components of the mobile device 100 without knowing the location of the mobile device. Upon receiving such a request, the component manager 401 may subsequently determine the location of the mobile device 100 (as described above) and process the request if the mobile device is within the periphery region or if the mobile device is outside the restricted geographic region entirely (i.e., the request is valid). Otherwise, the request is invalid and is disregarded. In still other embodiments, the user may manually make requests to the component manager 401 to enable components of the mobile device 100 via the keypad 228 (FIG. 2) or the touch screen LCD 230 (FIG. 2) as shown by arrow 410. In such a case, before enabling the components via the operating system drivers, the component manager is configured to validate that the mobile device is not within a restricted geographic region (via locating system 405 as shown by arrow 403) whose rule set prohibits the enabling of the components that the user is requesting to enable.

Valid requests (i.e., requests in which the mobile device is not within a restricted geographic region) are processed by the component manager 401. In particular, the component manager 401, by way of the drivers 304 (FIG. 3) provided by the operating system running on the DSP 202 (FIG. 2), proceeds to enable hardware components 416 of the mobile device 100 as shown by arrow 408. After enabling the hardware components, the component manager 401 provides confirmation to the service requestor 402 (as shown by arrow 404), to the backend server 407 (as shown by dashed arrow 406), or to the mobile device itself via the display 102 (FIG. 1) by way of the indicators 108 (FIG. 1). In alternative embodiments, confirmation made be provided via other hardware components of the mobile device such as the vibrator 226 (FIG. 2), the speaker 214 (FIG. 2), or others.

Figure 6:
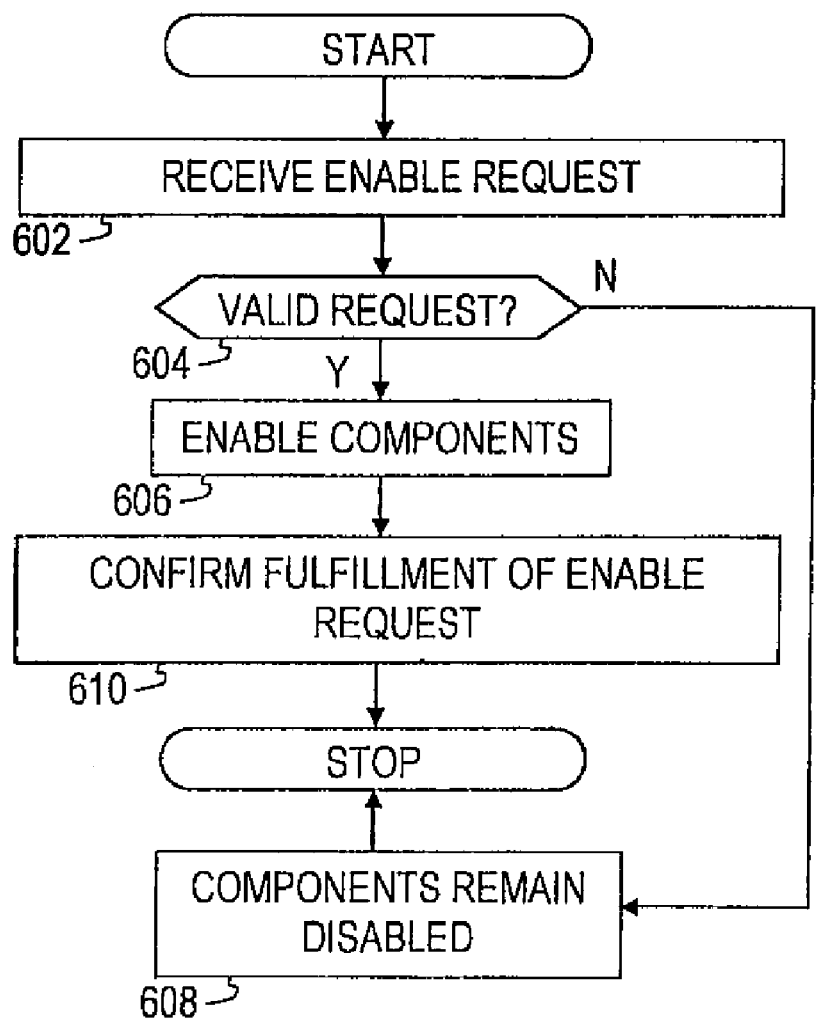
FIG. 6 is a second method in accordance with embodiments of the invention configured for location-based device control.

The foregoing process is shown as a flow diagram in FIG. 6. In block 602, the mobile device 100 may receive requests to enable previously disabled hardware components. Upon receiving a request to enable, the component manager in block 604, by way of the location monitor and the rules monitor, will retrieve the location of the mobile device 100 and determine if the request is valid given the current location of the device and the prescribed rule set for that location. If the mobile device 100 is within a restricted geographic region (i.e., the request is invalid), then the request will be disregarded and the components will remain disabled in block 608. If the request is valid, then the previously disabled components will be enabled in block 606. The enabling is done by the component manager by way of the drivers 304 provided by the operating system running on the DSP 202. After enabling of the components is complete, in block 610, the component manager confirms fulfillment of the request to enable to the user of the mobile device, to the service requestor, or to the backend server.

From the description provided herein, those skilled in the art are readily able to combine software created as described from the methods with appropriate general purpose or special purpose computer hardware to create a computer system and/or computer subcomponents embodying the invention, to create a computer system and/or computer subcomponents for carrying out the method of the invention, and/or to create a computer-readable media for storing a software program to implement the method aspects of the invention. The computer-readable medium may be, for example, a volatile memory, a non-volatile memory, a compact disc read only memory (CDROM), an electrically erasable programmable read only memory (EEPROM), a hard disk, a floppy disk, an optical disk, network connectivity devices, other ROM or RAM devices, or the like.

The above discussion is meant to be illustrative of the principles and various embodiments of the present invention. Numerous variations and modifications will become apparent to those skilled in the art once the above disclosure is fully appreciated. For example, although the discussion has at times assigned certain functions to the local server or the backend server, in alternative embodiments any of those functions may be performed by either of the two servers. Additionally, certain functions may be spread between the local server and the backend server. It is intended that the following claims be interpreted to embrace all such variations and modifications.

The invention claimed is:

1. A system comprising:
   a mobile device comprising a component manager, a location monitor, and a rules monitor, wherein the rules monitor receives a rule set from a server and provides the rule set to the component manager, wherein the component manager disables the operation of at least one hardware component of the mobile device based on a location of the mobile device determined by the location monitor and based on the rule set; and
   wherein the component manager provides confirmation of the disablement of the at least one hardware component of the mobile device to the server.

2. The system as defined in claim 1 wherein the location monitor determines the location of the mobile device using at least one of a global positioning system (GPS) satellite network and triangulation with a plurality of wireless base stations.

3. The system as defined in claim 1 wherein the component manager provides confirmation of the disablement of the at least one hardware component by way of at least one of visual indicators displayed on a graphical display of the mobile device; a database entry within the server; at least one of an audible tone and other audible message generated by at least one of the mobile device and the server; and by way of a visual indication via a graphical user interface electrically coupled to the server.

4. The system as defined in claim 1 wherein the at least one hardware component of the mobile device comprises at least one of a camera component; an audio recording component; a video recording component; a networking component; an audible output component comprising a speaker; an inaudible output component comprising a vibrator; a graphical user interface; an input component comprising at least one of a keypad and a microphone; and a port comprising at least one of an infrared (IR) and a universal serial bus (USB) port.

5. The system as defined in claim 1 wherein the mobile device comprises at least one of a mobile phone; a personal digital assistant (PDA); a pager; a mobile computer; a digital camera; a digital music player; a digital calculator; and an electronic key fob.

6. The system as defined in claim 1 wherein the rule set defines a geographic region comprising a restricted region of operation within which the at least one hardware component of the mobile device is disabled.

7. The system as defined in claim 6 wherein the rule set defines the at least one hardware component of the mobile device that is disabled within the restricted region of operation of the geographic region.

8. The system as defined in claim 6 wherein the geographic region further comprises a periphery region circumscribing the restricted region of operation, wherein the at least one hardware component of the mobile device that was previously disabled can be enabled.

9. A computer-readable medium storing a component manager software program that, when executed by the processor of a mobile device, causes the processor to:
   receive a request to disable operation of at least one hardware component of the mobile device from a requestor, wherein the request is received based on a location provided by a locating subsystem;
   when no manual deny input is received, disable the operation of the at least one hardware component of the mobile device based on the request by way of operating system drivers;
   when a manual deny input is received, not disable the operation of the at least one hardware component of the mobile device;
   provide confirmation of the disabled operation of the at least one hardware component of the mobile device to the requestor;
   receive a request to enable operation of the at least one hardware component from the requestor, wherein the request is received based on a second location provided by the locating subsystem;
   enable the operation of the at least one hardware component based on the request by way of operating system drivers; and
   provide confirmation of the enabled operation of the at least one hardware component to the requestor.

10. The computer-readable medium as defined in claim 9 wherein the operation of the at least one hardware component is one of disabled and enabled based on one of the location and the second location provided by the locating subsystem.

11. The computer-readable medium defined in claim 9 wherein the confirmation comprises at least one of or more selected from the group: visual indicators displayed on a graphical display of the mobile device; a database entry within the server; at least one of an audible tone and an other audible message generated by at least one of the mobile device and the server; and a visual indication via a graphical user interface electrically coupled to the server.

12. The computer-readable medium of claim 9, wherein the component manager software program, when executed by the processor of the mobile device, causes the processor to download a content in response to a security challenge and wherein providing confirmation of the disabled operation of the at least one hardware component comprises playing the content.

13. A method comprising:
   defining a restricted geographic region and a rule set corresponding to the restricted geographic region defining at least one hardware component of a mobile device is to disable within the restricted geographic region;
   transmitting a request to disable operation of the at least one hardware component of the mobile device in the restricted geographic region; and
   transmitting a content for playback by the mobile device to confirm the disabled operation of the at least one hardware component of the mobile device.

14. The method of claim 13, wherein transmitting the content comprises transmitting a content of the day.

15. The method as defined in claim 14 further comprising determining that the mobile device is within the restricted geographic region, and wherein the request comprises a request to disable the at least one hardware component of the mobile device as prescribed by the rule set.

16. The method as defined in claim 15 further comprising transmitting a second request to enable the at least one hardware component of the mobile device that was previously disabled.

17. The method as defined in claim 14 further comprising verifying that the mobile device is powered on.

18. The method as defined in claim 14 wherein the defining further comprises defining a periphery region circumscribing the restricted geographic region.

19. The method as defined in claim 18 further comprising determining that the mobile device is within the periphery region and transmitting a second request to enable the at least one hardware component of the mobile device based on determining that the mobile device is within the periphery region.

20. The method as defined in claim 14 wherein the confirmation comprises at least one of: visual indicators displayed on a graphical display of the mobile device; a database entry within a server; at least one of an audible tone and another audible message generated by at least one of the mobile device and the server; and a visual indication via a graphical user interface electrically coupled to the server.

* * * * *